(12) United States Patent
Satou et al.

(10) Patent No.: US 11,077,634 B2
(45) Date of Patent: Aug. 3, 2021

(54) TIRE VULCANIZING METHOD

(71) Applicant: The Yokohama Rubber Co., LTD., Tokyo (JP)

(72) Inventors: Hajime Satou, Hiratsuka (JP); Noboru Takita, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 287 days.

(21) Appl. No.: 16/095,319

(22) PCT Filed: Mar. 31, 2017

(86) PCT No.: PCT/JP2017/013568
§ 371 (c)(1),
(2) Date: Oct. 19, 2018

(87) PCT Pub. No.: WO2017/183422
PCT Pub. Date: Oct. 26, 2017

(65) Prior Publication Data
US 2019/0134932 A1    May 9, 2019

(30) Foreign Application Priority Data
Apr. 19, 2016  (JP) .............................. JP2016-083489

(51) Int. Cl.
*B29D 30/06* (2006.01)
*B29C 35/02* (2006.01)

(52) U.S. Cl.
CPC ...... *B29D 30/0662* (2013.01); *B29C 35/0288* (2013.01); *B29D 30/0633* (2013.01);
(Continued)

(58) Field of Classification Search
CPC ........ B29D 30/0662; B29D 2030/0665; B29D 2030/0675; B29C 35/0288
See application file for complete search history.

(56) References Cited

U.S. PATENT DOCUMENTS 3,649,729 A    3/1972    Davis et al.
5,055,245 A    10/1991   Hisatomi et al.
(Continued)

FOREIGN PATENT DOCUMENTS

JP    S59-093338    5/1984
JP    S60-013250    1/1985
(Continued)

OTHER PUBLICATIONS

Translation of JP2014226900A.*
International Search Report for International Application No. PCT/JP2017/013568 dated May 16, 2017, 4 pages, Japan.

*Primary Examiner* — Nahida Sultana
*Assistant Examiner* — Asha A Thomas
(74) *Attorney, Agent, or Firm* — Thorpe North & Western

(57) ABSTRACT

Provided is a tire vulcanizing method enabling an optimum vulcanization operation for each tire by measuring the temperatures of the inner surface and the outer surface of a tire until the demolding timing without damaging the tire and by determining the vulcanized state of the tire accurately based on the measured temperature data to efficiently produce uniformly vulcanized tires especially under conditions where the temperature of a mold fluctuates. During vulcanization of a tire G, the temperatures of the inner surface and the outer surface at a plurality of principal portions representing the tire G are measured, and the demolding timing is determined according to the equivalent degree of vulcanization indicating the degree of progress in crosslinking reaction calculated based on the temperature data measured.

4 Claims, 5 Drawing Sheets

(52) U.S. Cl.
CPC .. *B29D 30/0654* (2013.01); *B29D 2030/0639* (2013.01); *B29D 2030/0665* (2013.01); *B29D 2030/0666* (2013.01); *B29D 2030/0675* (2013.01); *B29D 2030/0677* (2013.01)

(56) References Cited

U.S. PATENT DOCUMENTS

| | | |
|---|---|---|
| 2016/0082681 A1 | 3/2016 | Takizawa et al. |
| 2017/0001340 A1 | 1/2017 | Koyanagi |

FOREIGN PATENT DOCUMENTS

| | | |
|---|---|---|
| JP | H07-040355 | 2/1995 |
| JP | 2005-212150 | 8/2005 |
| JP | 2005-271534 | 10/2005 |
| JP | 2014-226900 | 12/2014 |
| JP | 2015-101005 | 6/2015 |
| JP | 2015-223755 | 12/2015 |
| WO | WO 2014/192742 | 12/2014 |
| WO | WO 2015/182590 | 12/2015 |

\* cited by examiner

TIRE VULCANIZING METHOD

TECHNICAL FIELD

The present technology relates to a tire vulcanizing method, and more specifically, relates to a tire vulcanizing method enabling an optimum vulcanization operation for each tire by measuring the temperatures of the inner surface and the outer surface of a tire until the demolding timing without damaging the tire and by determining the vulcanized state of the tire accurately based on the measured temperature data to efficiently produce uniformly vulcanized tires especially under conditions where the temperature of a mold fluctuates.

BACKGROUND ART

To achieve good vulcanization quality with a uniform vulcanized state during vulcanization of tires, main factors that affect the vulcanization rate are determined for each tire, and vulcanization operations suitable for the individual tires are performed by taking the effects into consideration, for example, adjusting vulcanization time for each tire. Thus, the quality of tires that constitute a production lot is homogenized. To perform such a vulcanization operation for each tire, it is important that the temperatures in predetermined portions of the tire to be vulcanized be accuracy determined during vulcanization.

To measure the temperatures of a tire during vulcanization, a method is proposed in which a temperature sensor chip with a radio transmitter is buried in advance at a desired temperature measurement location of an unvulcanized tire to obtain temperature data at the temperature measurement location using the temperature sensor chip (for example, Japan Unexamined Patent Publication No. 2015-101005). However, chips buried in a tire of which temperature increases up to about 200° C. and having functions of measuring the temperature and transmitting the temperature to the outside of a mold by radio signal or receiving systems provided to a vulcanizer may present a high hurdle both from a technological and cost point of view. In addition, burying the temperature sensor chip in the tire disadvantageously leaves a foreign material behind that may damage or deteriorate the durability in the tire.

Moreover, to determine the temperature distribution inside a tire during vulcanization, a method is proposed in which the temperatures inside the tire are estimated based on the temperatures of a jacket, a mold, and a bladder using an analysis model to determine the slowest point from the estimated temperatures (for example, Japan Unexamined Patent Publication No. 07-40355). However, as the temperatures inside the tire are estimated based on the temperature measured at locations separate from the tire surface and via a thermally discontinuous interface between the mold and the rubber, so to speak, the vulcanized state cannot be constantly determined accurately when the property of the discontinuous interface changes due to, for example, effects of high temperature.

SUMMARY

The present technology provides a tire vulcanizing method including measuring the temperatures of the inner surface and the outer surface of a tire from the beginning to the end during vulcanization press without damaging the tire and determining the vulcanized state of the tire with sufficient accuracy based on the measured temperature data to enable an optimum vulcanization operation for each tire.

The tire vulcanizing method of the present technology includes, measuring a temperature of an inner surface and a temperature of an outer surface of a tire at a plurality of principal portions representing the tire during vulcanization of the tire, and determining a demolding timing according to an equivalent degree of vulcanization calculated based on temperature data about the measured temperatures, the equivalent degree of vulcanization indicating a degree of progress in crosslinking reaction.

In the present technology, the temperatures of the inner surface and the outer surface at the plurality of principal portions representing the tire are continuously measured during vulcanization of the tire, and the temperatures and the equivalent degrees of vulcanization in the cross section of the tire are calculated based on the temperature data. This enables the vulcanized state of the tire to be determined with sufficient accuracy without damaging the tire. Determining the demolding timing during vulcanization according to the vulcanized state of the tire enables an optimum vulcanization operation for each tire.

In the present technology, an indicator of the vulcanized state that is appropriate and acceptable as a product is preferably determined based on quality required for each portion of the tire, and the demolding time is preferably defined as a point in time at which all the vulcanized states based on the temperature data for each portion of the tire satisfy the indicator. Although the timings at which the tread portion, the side portion, and the bead portion reach the best vulcanized states do not necessarily coincide, determining the demolding timing during vulcanization by determining the indicator of the vulcanized state with consideration of quality balance among the respective portions such that the tire achieves the best quality as a whole yields a tire having the best quality as a whole and having an appropriate vulcanization quality in each portion of the tire.

In the present technology, vulcanization information relating to a matter prioritized in determining the demolding timing during vulcanization is preferably coded and provided for the tire. Recording the vulcanization information relating to the matter prioritized in determining the demolding timing during vulcanization of the tire as tire attributes as above enables selection of a tire, prioritizing performance more preferable for the needs during the use of a vehicle on which the tire is mounted and the like. Thus, the increase in the use value of the tire is ensured.

DETAILED DESCRIPTION

Figure 1:
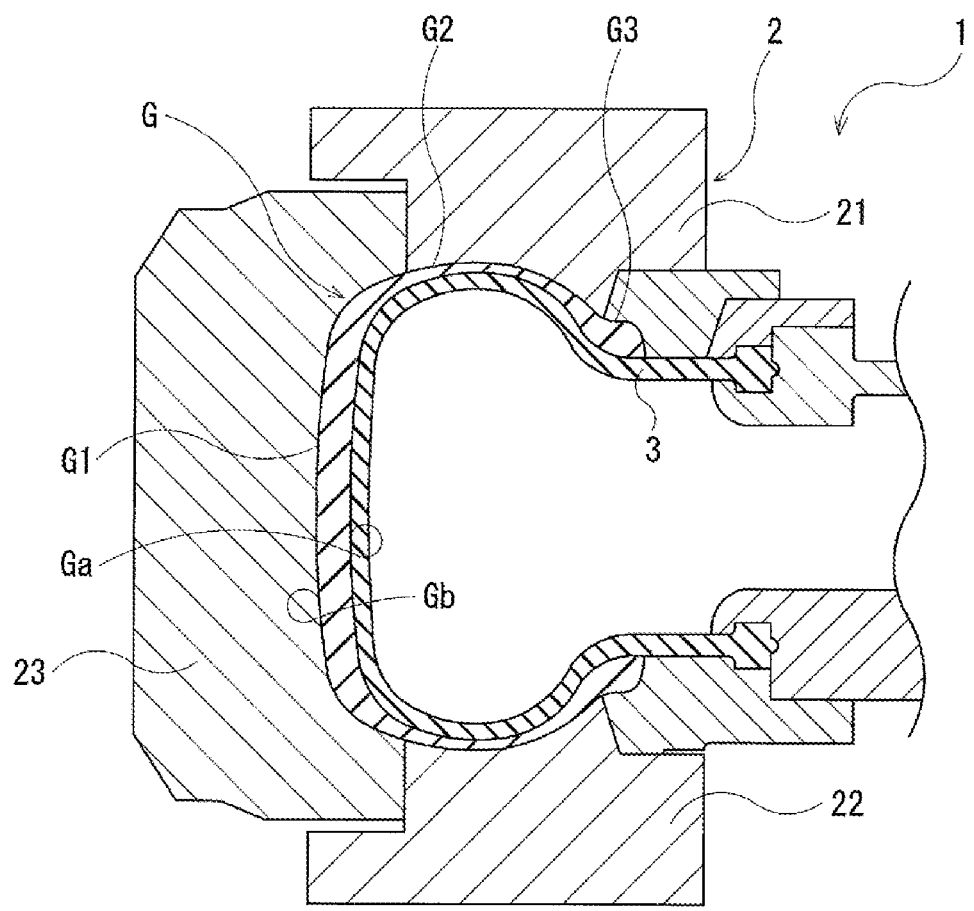
FIG. 1 is a cross-sectional view illustrating an example of a tire vulcanization device used in a tire vulcanizing method according to an embodiment of the present technology.

Configurations of embodiments of the present technology are described in detail below with reference to the accompanying drawings. FIG. 1 illustrates a vulcanization device 1 used in a tire vulcanizing method according to an embodiment of the present technology while a bladder 3 is pressing an unvulcanized tire G against the molding surface of a mold 2 during vulcanization. The mold 2 includes mold pieces 21, 22, and 23. The tire G primarily includes a tread portion G1, a side portion G2, and a bead portion G3. During vulcanization, the inner surface Ga of the tire G is brought into contact with the bladder 3, and the outer surface Gb is brought into contact with the mold 2.

During vulcanization of the tire G, the surface temperatures at locations representing at least the tread portion G1, the side portion G2, and the bead portion G3 are measured at two locations for each of the inner surface Ga and the outer surface Gb, i.e., at six locations in total. Although the pair of the measurement points at inside and outside the tire are preferably located geometrically close to each other, any locations similar in thermal properties, which display equivalent temperature behavior, may alternatively be adopted. For example, when a position on the tire is expressed in relation to the center line, temperatures at an identical latitude may be regarded as the locations similar in thermal properties, which display equivalent temperature behavior, due to the symmetry. In a case where the distance relationship or the positional relationship with a heat source or the gauge thickness of the unvulcanized tire is equivalent, locations with a small amount of displacement in latitude may also be regarded as the locations similar in thermal characteristics, which display equivalent temperature behavior.

Figure 2:
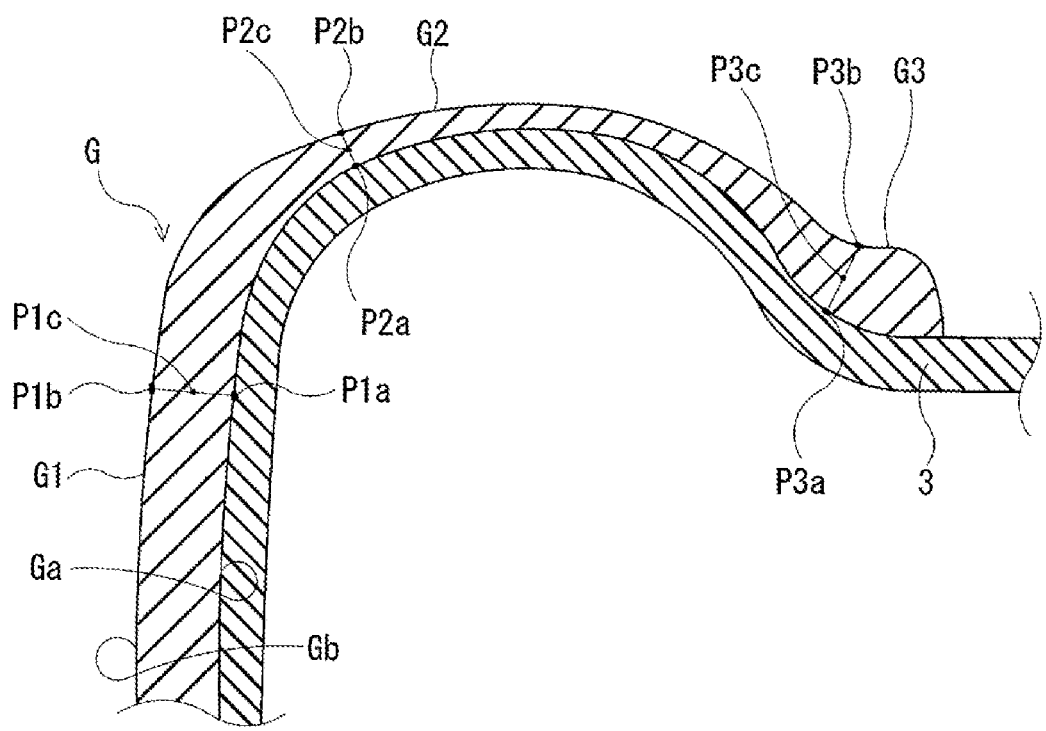
FIG. 2 is an enlarged cross-sectional view illustrating an unvulcanized tire and a bladder in FIG. 1.

As illustrated in FIG. 2, the processing point temperatures of the bladder 3 during vulcanization are measured as a function of time at measurement points P1a, P2a, and P3a respectively located on the inner surface Ga of the tire G at the tread portion G1, the side portion G2, and the bead portion G3. Temperature measuring mechanisms at the measurement points P1a, P2a, and P3a are not particularly limited, and, for example, structures including temperature measuring instruments such as thermocouples disposed inside the bladder 3 may be adopted. Moreover, the bladder is composed of rubber reinforced by carbon black as is the tire, and thus has thermal properties identical to an unvulcanized tire. Thus, the temperature of the inner surface of the bladder may be measured and, taking the thickness of the bladder into consideration, the temperature of the inner surface of the tire can be estimated. Even in this case, however, in a case where a mixture of nitrogen gas and steam is used as a heating medium, at least the heights (latitudes on the center line) need to be equivalent as a significant difference in temperature may arise between upper and lower portions inside the bladder. On the other hand, the processing point temperatures of the mold 2 during vulcanization are measured as a function of time at measurement points P1b, P2b, and P3b respectively located on the outer surface Gb of the tire G in the tread portion G1, the side portion G2, and the bead portion G3. Temperature measuring mechanisms at the measurement points P1b, P2b, and P3b are not particularly limited, and, for example, structures including a temperature measuring instrument such as a thermocouple disposed inside a hole formed in the mold 2 may be adopted, wherein a temperature sensing portion (for example, a contact point of the thermocouple) is brought into direct contact with the surface of the tire without being thermally affected easily by the temperature of the mold via a heat blocking zone. Thus, the temperature measuring mechanisms disposed inside the mold 2 and the bladder 3 enable measurement of the temperatures on the inner surface Ga and the outer surface Gb in the respective portions of the tire G without damaging the tire G, which is suitable for production of tire products.

In an embodiment of the present technology, the temperature and the equivalent degree of vulcanization indicating the degree of progress in crosslinking reaction are estimated for a substantially central portion in the thickness direction of the tire G at a location included in a portion where vulcanization may progress the slowest during vulcanization, i.e. the slowest vulcanization location. For example, in the tread portion G1, the position of the substantially central portion in the thickness direction of the tire G corresponds to a substantially midpoint of a line segment connecting the measurement point P1a on the inner surface Ga and the measurement point P1b on the outer surface Gb of the tire G, and may be regarded as a midpoint P1c illustrated in FIG. 2. Similarly, in the side portion G2 and the bead portion G3, the midpoints are respectively defined as P2c and P3c. That is, the temperatures and the equivalent degrees of vulcanization at the midpoints P1c, P2c, and P3c located in the substantially central portion in the thickness direction of the tire G are estimated.

The temperatures at the midpoints P1c, P2c, and P3c during vulcanization may be estimated by setting an initial condition (initial temperature of the tire G), the temperatures of the inner surface Ga of the tire G (processing point temperatures of the bladder 3 at the measurement points P1a, P2a, and P3a), and the temperatures of the outer surface Gb (processing point temperatures of the mold 2 at the measurement points P1b, P2b, and P3b) as boundary conditions and then by numerically solving the heat conduction equation. Various methods may be used to numerically solve the heat conduction equation. For example, Fourier's heat conduction equation may be numerically solved using a commercially available software and the like based on the above-described boundary conditions, the thickness of the tire G, and the thermal diffusivity of the tire G. Alternatively, a difference equation may be created from the heat conduction equation, and a graphic solution called Schmidt's method may be executed by a computer. In this case, for example, the difference equation may be solved using spreadsheet software (for example, Excel (trade name)). The temperatures at the midpoints P1c, P2c, and P3c may be calculated by numerically solving the heat conduction equation using any one of the above-described methods.

As is commonly known, the equivalent degree of vulcanization refers to the amount of vulcanization reaction. As the vulcanization rate changes according to the vulcanization temperature, the vulcanization rate is determined for each vulcanization temperature. The vulcanization rate is then multiplied by time and integrated with respect to time to calculate the equivalent degree of vulcanization. The vulcanization reaction rate constant K indicating the vulcanization rate is calculated using the following Equation (1).

$$K = A \times \exp\{-E/(R \times T)\} \tag{1}$$

Where A is a constant specific for rubber, E is an activation energy, R is a gas constant, and T is the vulcanization temperature.

In the above-described tire vulcanizing method, the temperatures of the inner surface Ga and the outer surface Gb at the plurality of portions of the tire G are measured during vulcanization of the tire G, and the temperatures and the equivalent degrees of vulcanization in the cross section of the tire G are calculated based on the temperature data. This enables the vulcanized state of the tire G to be determined accurately.

Figure 3:
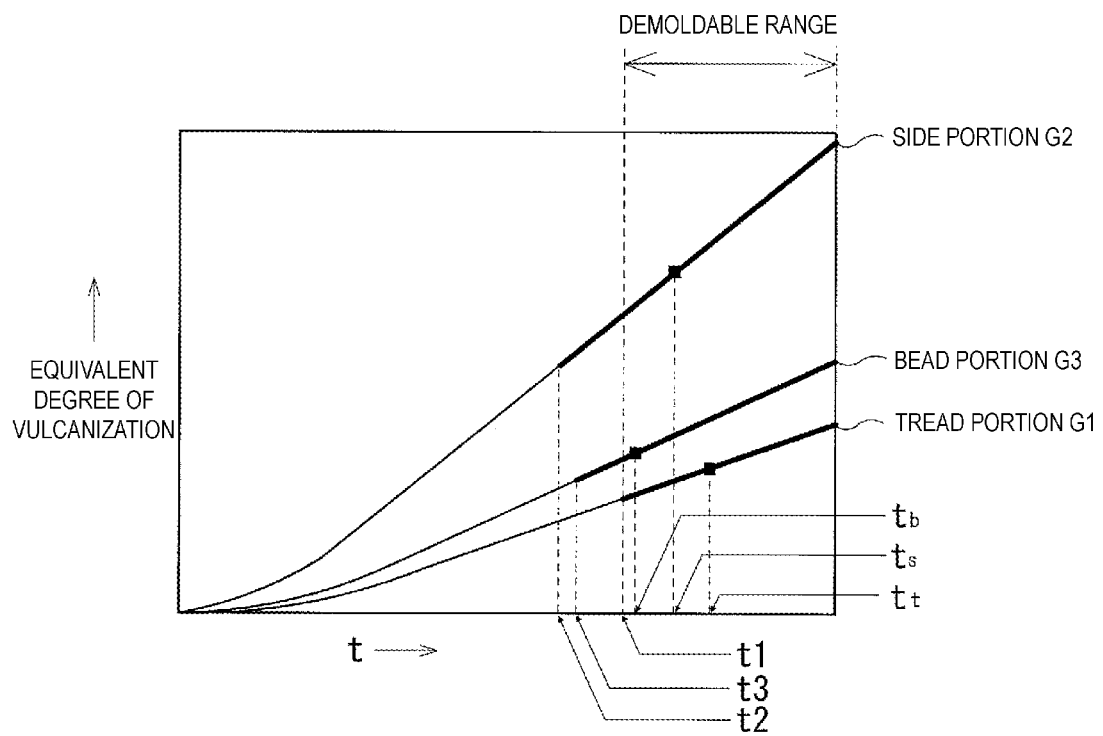
FIG. 3 is a graph illustrating the relationship between the vulcanized state (equivalent degree of vulcanization) calculated based on temperature data measured in predetermined portions of the tire and an elapsed time t in the tire vulcanizing method according to an embodiment of the present technology.

FIG. 3 illustrates the relationship between the vulcanized state (equivalent degree of vulcanization) calculated based on temperature data measured in each portion of the tire G and an elapsed time t. The vertical axis represents the equivalent degree of vulcanization, and the horizontal axis represents the elapsed time t (min). As illustrated in FIG. 3, in general, the tread portion G1, the side portion G2, and the bead portion G3 of the tire G each has an individual equivalent degree of vulcanization changing according to the surface temperature, the thickness, the thermal diffusivity, and the like as the vulcanization proceeds.

As the required quality and the unvulcanized rubber to be used vary for each portion of the tire G, the vulcanization time to achieve the quality also varies. For example, for the case of the tread portion G1, the equivalent degree of vulcanization gradually increases as the vulcanization proceeds, and reaches the level that satisfies the quality required for the tread portion G1 at some point in time. The point in time at which the required quality is satisfied is defined as t1, and demolding after the point t1 (a thick line portion of an equivalent vulcanization degree curve illustrated in FIG. 3) yields the tire G satisfying the quality required for the tread portion G1. As the vulcanization further proceeds from the point t1, the equivalent degree of vulcanization reaches the level that satisfies the optimum quality in the tread portion G1. The point in time at which the optimum quality is satisfied in the tread portion G1 is defined as $t_t$, and demolding at the point $t_t$ yields a tire having the optimum vulcanization quality in the tread portion G1.

Similarly to the tread portion G1 described above, points t2 and t3 respectively indicate the points in time at which the qualities required for the side portion G2 and the bead portion G3 are satisfied, and points $t_s$ and $t_b$ indicate the points in time at which the optimum qualities required for the respective portions are satisfied. Demolding at the points $t_s$ and $t_b$ respectively yields a tire having the optimum vulcanization qualities in the side portion G2 and the bead portion G3.

On the other hand, the vulcanization time is preferably as short as possible from the perspective of productivity of tires. Thus, the point in time at which all the qualities required for the tread portion G1, the side portion G2, and the bead portion G3 of the tire G are satisfied is the point of the shortest vulcanization time and of the highest productivity. In FIG. 3, the longest elapsed time t among the points t1, t2, and t3 at which the quality required for each portion of the tire G is satisfied is the point t1 of the tread portion G1. Thus, the point t1 at which the quality required for the tread portion G1 is satisfied is the most preferable point from the perspective of productivity. Moreover, from the perspective of productivity, the demoldable range is a period after the point t1, and demolding in this range means that the productivity of the tire G is ensured.

As described above, the indicators of the vulcanized state appropriate and acceptable as a product are determined based on the quality required for each portion of the tire G and the demolding time is defined as the point in time at which all the vulcanized states based on the temperature data at each portion of the tire G satisfy the indicators. Thus, the tire G having the best quality as a whole and having the appropriate vulcanization quality in each portion of the tire G can be obtained.

Figure 4:
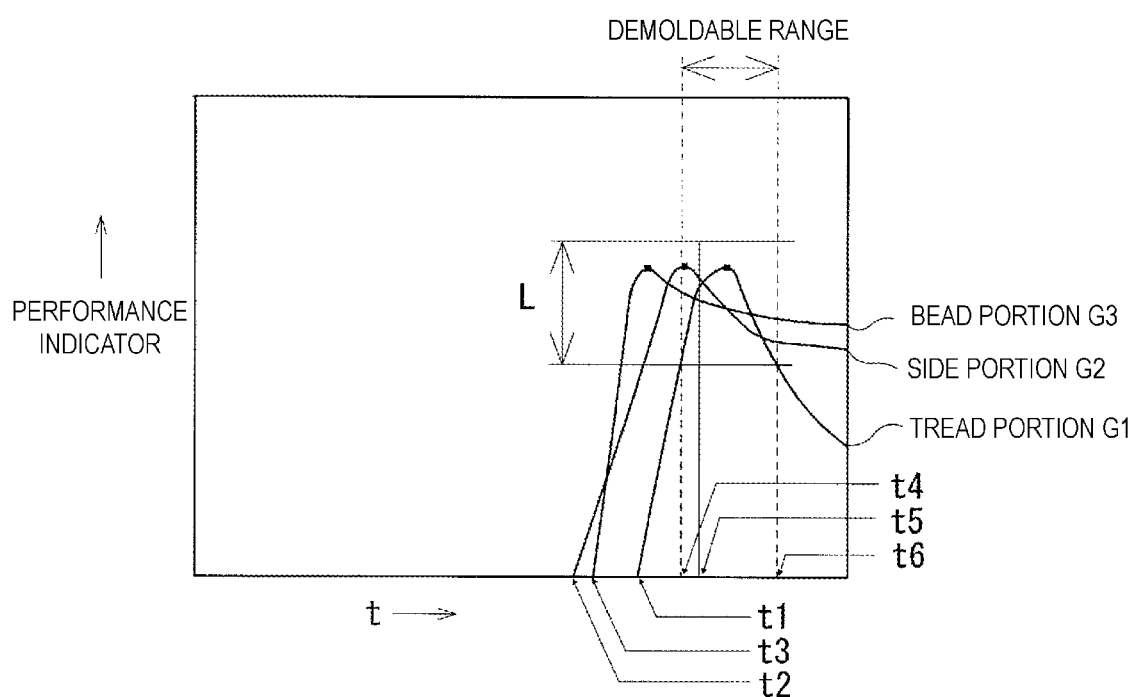
FIG. 4 is a graph illustrating the relationship between the vulcanization quality (performance indicator) in the predetermined portions of the tire and the elapsed time tin the tire vulcanizing method according to an embodiment of the present technology.

FIG. 4 illustrates the relationship between the vulcanization quality (performance indicator) of each portion of the tire G calculated based on the temperature data and the elapsed time t. The performance indicator illustrated in FIG. 4 is premised on the above-described tire satisfying the quality required in each portion of the tire, and intelligibly illustrates whether the vulcanization quality is below or over the minimum level to be satisfied in the elapsed time. The vertical axis represents the performance indicator, and the horizontal axis represents the elapsed time t (min).

The point in time at which the quality best suited to each portion of the tire G is satisfied varies, and the vulcanization time to achieve the quality also varies. For example, as illustrated in FIG. 3, the quality required for the tread portion G1 is not achieved in the tread portion G1 until a certain amount of time passes after the start of the vulcanization. Thus, the value of the performance indicator stays zero. The performance indicator curve then slopes upward after the point t1 at which the quality required for the tread portion G1 is achieved, and reaches the peak at the point $t_t$ at which the optimum quality is satisfied. As the vulcanization further proceeds, the vulcanization quality of the tread portion G1 deteriorates gradually after the point $t_t$. Similarly to the tread portion G1, the performance indicator curves of the side portion G2 and the bead portion G3 respectively slope upward from the points t2 and t3 at which the required qualities are achieved, and respectively reach the peaks at the points $t_s$ and $t_b$ at which the optimum qualities are satisfied. The vulcanization qualities of the side portion G2 and the bead portion G3 respectively deteriorate gradually after the points $t_s$ and $t_b$. The reductions in vulcanization quality are partly caused by, for example, deterioration in the quality of the rubber due to over-vulcanization.

Here, as illustrated in FIG. 4, an acceptable performance range, in which the design performance required for the tire is satisfied, is defined as L. Among the tread portion G1, the side portion G2, and the bead portion G3, the tread portion G1 is the slowest to reach the performance range L. The point in time at which the performance indicator curve of the tread portion G1 reaches the lower limit of the performance range L for the first time is defined as t4, and the point in time at which the performance indicator curve reaches the lower limit of the performance range L for the second time is defined as t6. Even though the quality required for each portion of the tire is satisfied, it is not preferable to demold when the design performance required for the tire is not satisfied. Thus, the period, during which the performance indicator curve of the tread portion G1 that is the slowest to reach the performance range L lies in the performance range L, that is, the period between t4 and t6, is the range of vulcanization time in which the quality and the performance range L required for the tread portion G1 are satisfied, and refers to the range of vulcanization time allowing demolding.

Moreover, in the period of vulcanization time between t4 and t6, during which demolding can be performed while the performance range L is ensured, t5 is defined as the point in time at which the performance indicators of the tread portion G1, the side portion G2, and the bead portion G3 are well-balanced. Demolding at the point t5 yields the tire most balanced in the performance indicators of all the portions of the tire. The degree of balance or harmony may also be determined by conditions under which the tire is used, that is, by the combination with operational conditions of a vehicle on which the tire is mounted. When comparing a taxi and a private car owned by a weekend driver, attaching importance to wear resistance for the former and to resistance to ultraviolet degradation at the side portion for the latter probably increases the use value and will benefit the customers.

In an embodiment of the present technology, the vulcanization information relating to the matters prioritized in determining the indicators as above is coded, and the coded priorities are recorded on the vulcanized tires as tire attributes. Upon coding the vulcanization information relating to the priorities, for example, in a case where priority is given to productivity to determine the demolding timing (in a case where the point t4 is set as the demolding timing), the supplementary code is "P" as shown in Table 1 and is provided for the tires. For example, QR codes (trade name) can be used to provide the supplementary codes for the tires.

TABLE 1

| Priority | Supplementary code |
| --- | --- |
| Productivity | P |
| Tread quality | T |
| Side quality | S |
| Bead quality | B |
| Balance of performance | A |

Coding the vulcanization information relating to the matters prioritized in determining the demolding timing during vulcanization and providing the information for the tires as the supplementary codes as above enable selection of a tire, prioritizing performance more preferable for the needs such as the use of a vehicle on which the tire is mounted and the like. Thus, the increase in the use value of each tire is ensured.

Figure 5:
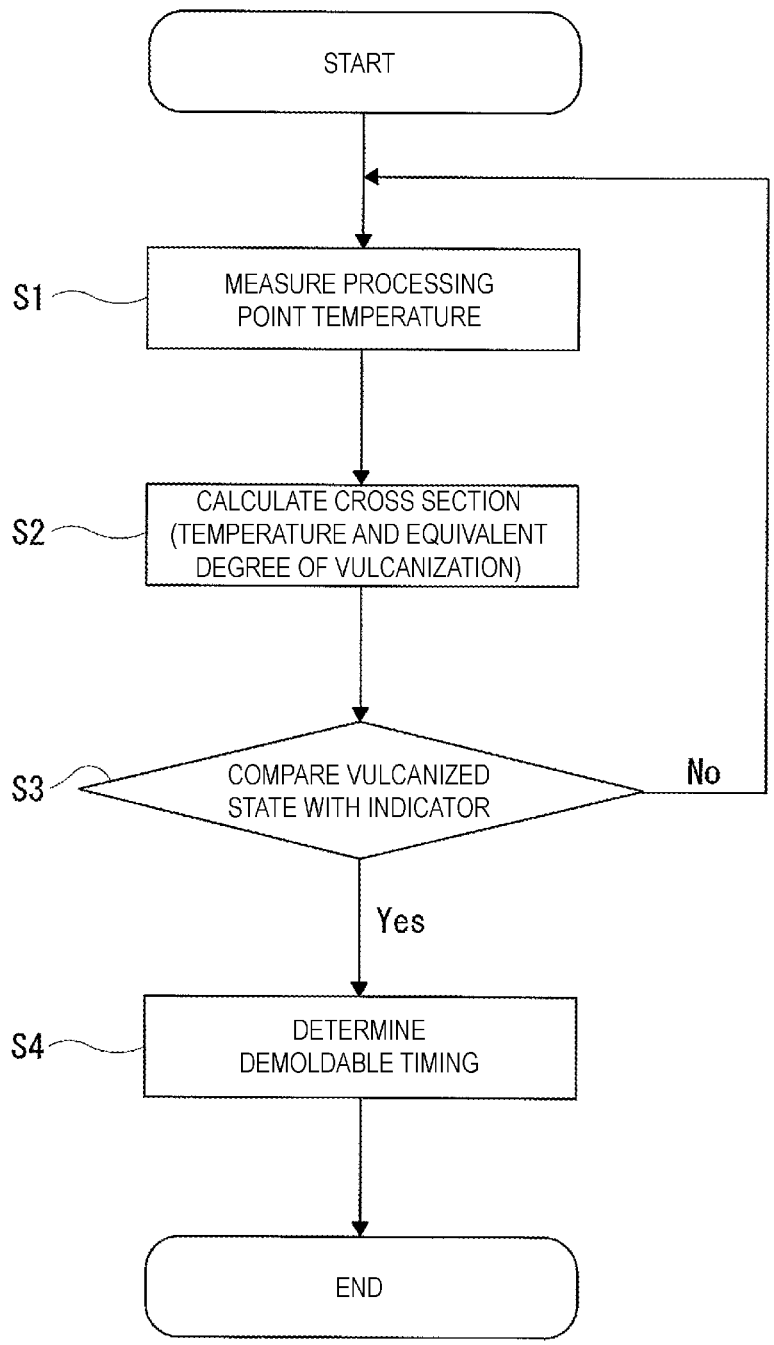
FIG. 5 is a flowchart illustrating a process during vulcanization until demolding in the tire vulcanizing method according to an embodiment of the present technology.

A process during vulcanization until the demolding timing is determined in a case where the tire G is vulcanized using the vulcanization device 1 will now be described with reference to FIG. 5. First, in step S1, the processing point temperatures of the bladder 3 at the measurement points P1$a$, P2$a$, and P3$a$ on the inner surface Ga in the tread portion G1, the side portion G2, and the bead portion G3 of the tire G are measured, and the processing point temperatures of the mold 2 at the measurement points P1$b$, P2$b$, and P3$b$ on the outer surface Gb are measured.

Next, in step S2, the temperatures and the equivalent degrees of vulcanization at the midpoints P1$c$, P2$c$, and P3$c$ located in the substantially central portion in the thickness direction of the tire G are calculated using the temperature data measured in step S1 and the above-described calculation method.

Next, in step S3, it is determined whether the vulcanized state of the tire G based on the temperatures and the equivalent degrees of vulcanization at the midpoints P1$c$, P2$c$, and P3$c$ obtained in step S2 satisfies the indicator based on the quality or the productivity required for each portion of the tire. In a case where it is determined that the indicator is satisfied, the process proceeds to step S4. On the other hand, in a case where it is determined that the indicator is not satisfied, the process returns to step S1.

In step S4, the demoldable point in time during vulcanization is determined, and demolding is performed in the vulcanization device 1. The timing of demolding the tire G during vulcanization is determined in this manner.

The invention claimed is:

1. A tire vulcanizing method, comprising:
   measuring a temperature of an inner surface and a temperature of an outer surface of a tire at each of a tread portion, a side portion and a bead portion during vulcanization of the tire, the temperature of the inner surface of the tire being a processing point temperature of a bladder and the temperature of the outer surface of the tire being a processing point temperature of a mold; and
   determining a demolding timing according to an equivalent degree of vulcanization calculated based on temperature data about the measured temperatures, the equivalent degree of vulcanization indicating a degree of progress in crosslinking reaction.

2. The tire vulcanizing method according to claim 1, wherein
   an indicator of a vulcanized state that is appropriate and acceptable as a product is determined based on quality or productivity required for each portion of the tire, and a point in time at which all vulcanized states based on the temperature data for the portions of the tire satisfy the indicator is defined as the demolding timing.

3. The tire vulcanizing method according to claim 2, wherein
   vulcanization information relating to a matter prioritized in determining the demolding timing during vulcanization is coded and provided for the tire.

4. The tire vulcanizing method according to claim 1, wherein
   vulcanization information relating to a matter prioritized in determining the demolding timing during vulcanization is coded and provided for the tire.

* * * * *